United States Patent
Perlman et al.

(10) Patent No.: US 7,945,942 B2
(45) Date of Patent: May 17, 2011

(54) SYSTEM AND METHODS FOR EXCHANGING USER INTERFACE DATA IN A MULTI-USER SYSTEM

(75) Inventors: Brian S Perlman, Bothell, WA (US); Jay R Girotto, Kirland, WA (US); Caglar Gunyakti, Sammamish, WA (US); Kalin Toshev, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1083 days.

(21) Appl. No.: 11/183,196

(22) Filed: Jul. 15, 2005

(65) Prior Publication Data

US 2007/0016773 A1 Jan. 18, 2007

(51) Int. Cl.
*G06F 7/04* (2006.01)

(52) U.S. Cl. .................................. 726/2; 726/1

(58) Field of Classification Search .................. None
See application file for complete search history.

(56) References Cited

U.S. PATENT DOCUMENTS

| | | | |
|---|---|---|---|
| 6,055,637 A * | 4/2000 | Hudson et al. ................... 726/20 |
| 6,931,546 B1 * | 8/2005 | Kouznetsov et al. ............ 726/23 |
| 2005/0080897 A1 * | 4/2005 | Braun et al. ................... 709/225 |

* cited by examiner

*Primary Examiner* — Nasser Moazzami
*Assistant Examiner* — Carlton V Johnson
(74) *Attorney, Agent, or Firm* — Woodcock Washburn LLP

(57) ABSTRACT

A centralized process is provided for elevating portions of an application running under a user account to administrator privilege. A service security identifier is temporarily associated with the user and the portions of the application to be elevated to administrator privileges. The service security identifier is registered in the access control list to be accessed by the operating system. The centralized process may be used in the activation of software products.

11 Claims, 2 Drawing Sheets

SYSTEM AND METHODS FOR EXCHANGING USER INTERFACE DATA IN A MULTI-USER SYSTEM

FIELD

The system relates generally to computer systems, and more particularly to improvements in exchanging user interface data in a system.

BACKGROUND

Many computer applications run in non-interactive mode (not requiring input from the user) but must occasionally provide information to or elicit information from the user. Various methods exist to perform one-way communication to the user but they require elevating the user privilege or providing unsecured data routes back to the centralized process. This situation may arise when a user is required to activate software, for example after installing a new operating system. Product activation works by verifying that a software program's product key, which the user must use to install the software, has not been used on more computers than intended by the software's license.

After installation of the software product, a service is activated in the system that will notify the user that the product needs to be activated. The user can then use an activation wizard associated with the computer to provide the software product ID to the software vendor. This can be done through the internet or by phone. After the vendor checks its database to make sure that the software product ID is not being used to activate unlicensed software, the vendor will provide the user with a confirmation ID to activate the product. Typically, if the software product is not activated after a predetermined number of launches the software product will go to a reduced functionality mode (e.g. preventing the creation or editing of files). The activation of the product is done by a user with administrative privileges.

In computing, if a task is performed by a user having more privileges than necessary to do that task, there is an increased risk of inadvertent harm to computer resources. For example, if a file can only be deleted by a user with administrator privileges, then a user using an administrator account may inadvertently delete the file when performing another task that does require administrative privileges. If the user had been a user having lesser privileges, then the intended task could still have been performed but the inadvertent deletion would not have been allowed.

Thus, a recognized goal in computer security is the concept of least privilege, in which a user performing a task should run with the absolute minimum privileges (or identities, such as group memberships) necessary to do that task. However, there is no convenient way to add and remove a user's access rights and privileges. For example, in a typical operating system, when the user logs on, an access token is built for the user based on the user's credentials. The access token determines the access rights and privileges that the user will have for that session. As a result, the user will have those privileges for each task attempted during that session and for any future sessions. While ideally an administrator can set up multiple identities and log-on as a different user with different rights for each task, this may be considered burdensome.

In short, there is simply not a convenient way to change privilege levels or access rights, nor a way to further restrict privileges at a granularity finer than that created by the domain administrator. Other operating systems have similar problems that make running with least privileges an ideal that is rarely, if ever, practiced.

Providing a secure mechanism to notify and support users is a missing component in many systems. Ad hoc methods are available to launch applications or use insecure data pathways that can be intercepted by non-administrators and used in attacks against the system. The proposed methods here provide a simple, standardized way of solving this problem.

SUMMARY

A system and method supports two-way data transmission through standard COM protocol functions between binaries that can operate at low privilege.

The method implemented in a system having an operating system, an administrative account having administrator level privileges and at least one user account without administrator level privileges, provides the ability to perform operations requiring administrator privileges in a user account responsive to a user, by identifying the need to provide administrator level privileges to an application running in a non-administrator privileged mode; communicating the portion of the operations in the application requiring administrator level privileges; and elevating the portion of the operations of the application running in a non administrative privileged mode to administrator level privilege level.

A centralized process can simply display information to the user in a notification scenario or it can collect user input back through simple, standardized functions.

The system provides a minimal-privilege mechanism for displaying user interface notifications and wizards to all logged-on users in a multiple-user environment computer system. A centralized process monitors system state and can notify all users about changes as well as prompt for input that can be verified and applied to the system to correct various conditions.

DETAILED DESCRIPTION OF ILLUSTRATIVE EMBODIMENTS

Security Model

In a typical operating system, a user performs tasks by accessing system resources via processes. The system resources such as files, shared memory and devices are represented by objects. When a user logs on to the operating system and is authenticated, a security context is created for the user. Among the information included in the security context are a security identifier (Security ID or SID) and the listing of privileges assigned to the user. For example an administrator level user may have the privilege to set the system clock through a particular application programming interface (API). A process desiring access to an object specifies the type of access it desires. A security mechanism compares the Security ID with the actions requested by the process against the entries in an access control list. If a match is found a handle to the desired object is returned, otherwise access to the object is denied.

System and Method for Exchanging Interface Data

Figure 1:
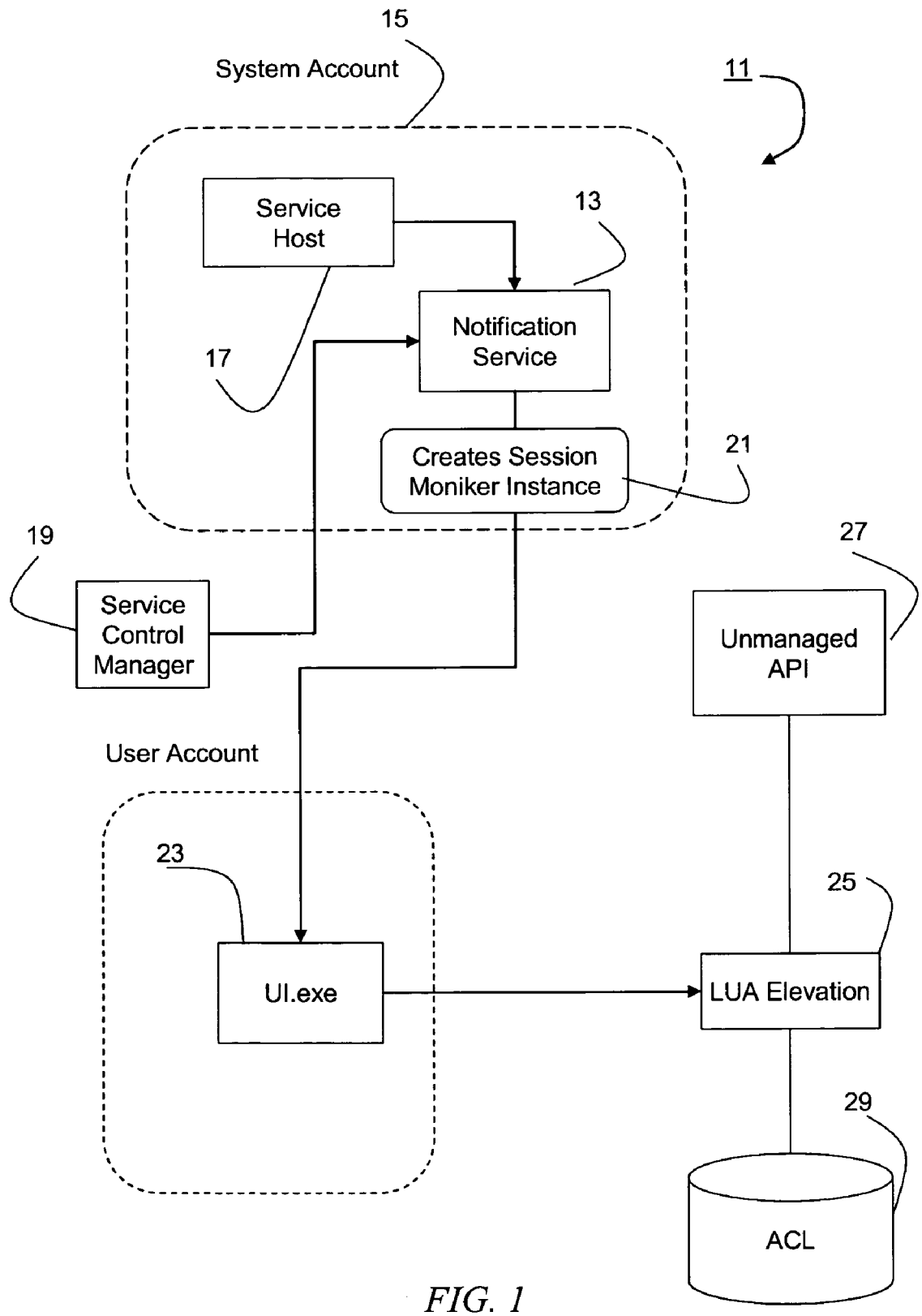
FIG. 1 is a block diagram illustrating a generalized system for exchanging interface data.

The illustrative embodiment of system 11 in FIG. 1 provides a centralized service to provide the exchange of interface data including a Notification Service 13 operating in a System Account 15 under the Service Host 17 (i.e. the computer being used by the user). A service is a program, routine, or process that performs a specific system function to support other programs, particularly at a low (close to the hardware) level. In this case notification service 13 performs a notification function. The notification service 13 service may be started in two ways: automatically, when the system starts up; or upon demand, by applications that use the functions provided by a Service Control Manager 19. The Service Control Manager 19 maintains the database of installed services and starts services and driver services upon system startup or upon demand. The Service Control manager 19 also maintains status information for running services and transmits control requests to running services.

The notification service 13 creates one interactive user context instance per user with a session moniker 21. The session moniker 21 creates a user interface executable program UI.exe 23 that is a mechanism to launch an out of process COM object in a specified user session. For example, the out of process COM object may be a per-user dialog application. In the case of a product activation implementation, the dialog application may be an interactive dialog box providing the user with the option to activate the product, change the product key or other actions relevant to the activation of the product. If a dialog application is created as a session moniker instance then the dialog application is re-launched as a traditional executable instead of a COM server.

UI.exe 23 creates an instance of a Least User Access Elevation binary application, LUA Elevation 25. LUA Elevation 25 is an out-of process thin wrapper for administrative level API calls. LUA Elevation 25 abstract administrator level API functions into a self contained binary that can be manifested to prompt for administrator credentials by the operating system security mechanisms. A service Security Identifier (SSID) will be allocated to the instance and stored in the Access control List (ACL 29). LUA Elevation 25 provides a way for non administrator level applications (Unmanaged API 27) to use administrative level functions in a standardized way.

Figure 2:
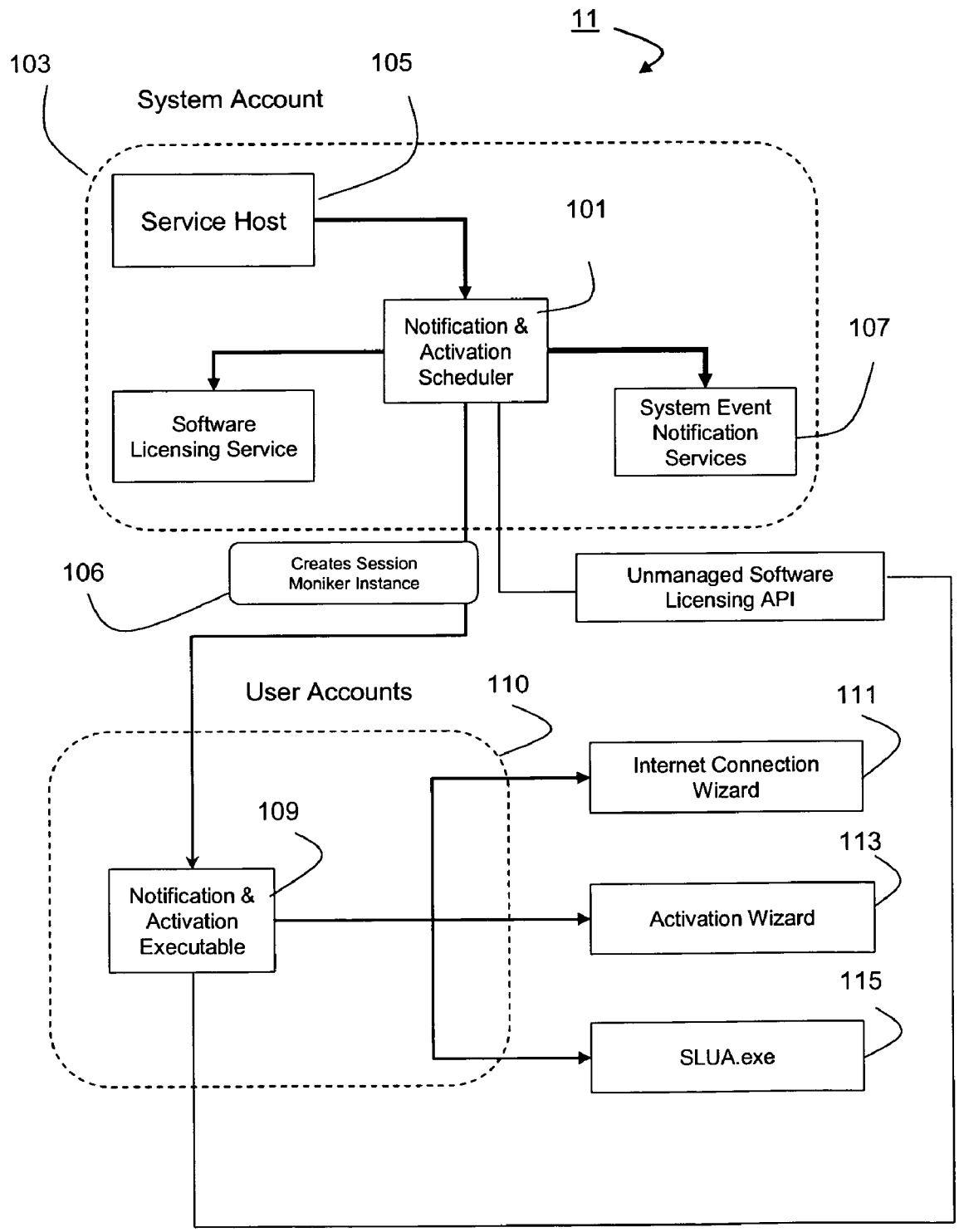
FIG. 2 is a block diagram of a product activation implementation for the system for exchanging interface data.

FIG. 2 illustrates the architectural design of a centralized notification application of the system 11 in a product activation method. The system 11 includes a Notification and Activation Scheduler 101. The Notification and activation scheduler 101 runs under a local service (system) account 103 and is managed by a Service Host 105. The Notification and Activation Scheduler 101 actively monitors license state for activation events or errors. In the case of automated activation, the Notification and Activation Scheduler 101 performs an activation attempt.

The Notification and Activation Scheduler 101 also creates an instance of the session object 106 for each user, licensing status and system state (availability of Internet connection to activation server, etc) and creates an instance of the session moniker object to notify users of invalid, tamper, reboot states. The session moniker uses a series of functions to call the equivalent CoCreateInstance( ) of a COM server in a specified session where the session ID is returned by the WTSQuerySession( ) function. The moniker in this case is a fully-qualified COM class id combined with the session ID where the session ID can either be the reserved name "Console" or the numeric value of the session instance (1, 2, . . . n). The session moniker is then parsed using MkParseDisplayNameEx( ) and the resulting IBinder object is associated with the corresponding class factory to create an instance. The instance is then returned to the caller where any supported COM functions can be used on the instance. For the notification service, the instance has a limited number of functions including re-spawning the server as a standard Win32UI application or calling asynchronous display methods to show the notification balloons for starting and completed automatic activation. To support the session moniker the COM instance must be marked in the COM registration of the AppId run as the current logged-on user.

The Notification and Activation Scheduler 101 subscribes to network and log on events through the System Event Notification Service 107 that is an automatic service of the operating system that supports connectivity. The System Event Notification Service 107 SENS can notify applications about three classes of system events: TCP/IP network events, such as the status of a TCP/IP network connection or the quality of the connection; user logon events and Battery and AC power events.

In today's operating systems, processes are shielded from each other. A client that needs to communicate with a component in another process cannot call the component directly, but has to use some form of inter-process communication provided by the operating system. Component Object Model (COM) provides this communication in a completely transparent fashion: it intercepts calls from the client and forwards them to the component in another process. Distributed COM (DCOM) enables object activation on a per-session basis by using a system-supplied session moniker. In the case of the Notification and Activation Scheduler 101, a session moniker is created to pass Action ID, activate, Remind and Action timeout instructions to a Software License User Interface executable file SLUI.exe 109.

SLUI.exe 109 may be started by the Session Moniker, the user, a system.CPL or on logon. SLUI.exe 109 can run as a stand-alone User Interface application or as a COM Local Server that runs under the user account in the user space 110.

SLUI.exe 109 recognizes several types of errors (such as used product key, incorrect product key, networking problems, etc.) and provides a User Interface for fixing the problem. SLUI.exe 109 also display system taskbar icon and balloon notification according to schedule set up in the system registry; may perform activation attempt for automatic activation; and display a Windows Activation Wizard that provides the following alternative activation options: phone activation; online product purchase; or entering new product key.

SLUI.exe 109 is used to configure an internet connection through an Internet Connection Wizard 111.

Additionally SLUI.exe 109 executes the Product Activation Wizard 113. Product Activation Wizard 113 provides a common User Interface API for product activation. The Product Activation Wizard 113 also provides a temporary Remote Access Service Connection for users with a modem but without an Internet Service Provider account.

SLUI.exe 109 also calls on a Least User Access Component, LUA Elevation binary (SLUA.exe) 115.

SLUA.exe 115 is an out-of-process (an .exe file that runs in its own process, with its own thread of execution) thin wrapper (a program or script that sets the stage and makes possible the running of another, more important program) for administrator level Software Licensing API calls. SLUA.exe 115 abstracts administrator privilege API function calls into a self contained binary that can be manifested to prompt for administrator credentials by the Operating system. In effect, SLUA 115 provides a way for non-administrative applications to use administrative level functions in a standardized way.

The notification and Activation Scheduler 101 may be provided as an executable function SLUINotify.dll. SLUINotify.dll is hosted by Service Host and performs centralized notification and activation. There are no external interfaces for SLUINotify.dll. It uses the schedule located in the registry to determine what (if any) User Interface action to perform. It also responds to system state change notifications and presents appropriate UX (tampering, hardware OOT). The User Interface action is then performed on all eligible desktops.

The activation schedule is stored in registry as binary data with an appropriate algorithm being used to calculate activation action to be performed.

The illustrative embodiments described in this specification are susceptible to various modifications and alternative constructions. It should be understood, however, that there is no intention to limit the claims to the specific forms disclosed, but on the contrary, the intention is to cover all modifications, alternative constructions, and equivalents falling within the spirit and scope of the specification.

What is claimed:

1. In a computer system having an operating system stored in a memory and a processor that processes said operating system, an administrative account having administrator level privileges and at least one user account without administrator level privileges, a method of performing operations on said processor requiring administrator privileges in a user account responsive to a user, comprising:
   upon system startup, automatically starting a notification service;
   upon a user logging on to the operating system, the notification service creating an interactive user context instance with a session moniker, the user context including a security identifier and a listing of privileges assigned to the user, the session moniker creating a user interface executable corresponding to a specified user session, the user interface executable creating an instance of an out of process thin wrapper for administrator level application program interface calls;
   identifying the need to provide administrator level privileges to an application running in a non-administrator privileged mode;
   communicating a portion of the operations in the application requiring administrator level privileges;
   elevating the portion of the operations of the application running in a non-administrative privileged mode to administrator level privilege level by temporarily associating, during the specified user session, the service security identifier with the user and the portions of the operations to be elevated to administrative privileges, wherein the service security identifier is allocated to the instance of the out of process thin wrapper for administrator level application program interface calls; and
   storing the service security identifier in an access control list.

2. The method of claim 1 wherein the step of identifying the need to provide administrator level privileges comprises the steps of scheduling a notification message and notifying the user.

3. The method of claim 2 wherein the step of notifying the user comprises displaying an interactive dialog application.

4. The method of claim 1 further comprising:
   executing at administrator level privilege the portions of the operations associated with the service security identifier.

5. The method of claim 1 wherein the portion of the operations in the application requiring administrator level privileges comprises an out of process COM object.

6. A system for elevating a portion of the operations of an application running in a non administrative privileged mode to administrator level privilege level comprising:
   a memory; and
   a processor that processes instructions for implementing the step of:
   automatically starting a notification service upon system startup,
   wherein, upon a user logging on to the operating system, the notification service creates an interactive user context instance with a session moniker, the user context including a security identifier and a listing of privileges assigned to the user, the session moniker creates a user interface executable corresponding to a specified user session, and the user interface executable creates an instance of an out of process thin wrapper for administrator level application program interface calls;
   identifying the need to provide administrator level privileges to an application running in a non-administrator privileged mode;
   communicating a portion of the operations in the application requiring administrator level privileges; and
   elevating the portion of the operations of the application running in a non administrative privileged mode to administrator level privilege level wherein the service security identifier is temporarily associated, during the specified user session with the user and the portions of the operations to be elevated to administrative privileges and storing the service security identifier in an access control list, and wherein the service security identifier is allocated to the instance of the out of process thin wrapper for administrator level application program interface calls.

7. The system of claim 6 wherein the portion of the operations in the application requiring administrator level privileges comprises an out of process COM object.

8. A processor implemented method for activating software, said processor programmed to implement the steps of:
   notifying a user of activation status;
   upon system startup, automatically starting a notification service;
   upon a user logging on to the operating system, the notification service creating an interactive user context instance with a session moniker instance for the user, the user context including a security identifier and a listing of privileges assigned to the user, the session moniker creating a user interface executable program corresponding to a specified user session, the user interface executable creating an instance of an out of process COM object for administrator level application program interface calls;
   launching an internet connection wizard;
   launching an activation wizard;
   launching a binary application for providing administrator level privilege to functions in the activation wizard;
   communicating a portion of the functions in the activation wizard requiring administrator level privileges;
   elevating the portion of the functions in the activation wizard running in a non-administrative privileged mode to administrator level pprivilege level by temporarily associating, during the specified user session, a service security identifier with the user and the functions to be provided administrative level privileges, the service security identifier including user information, and administrator level privilege assigned to functions in non administrator level applications, wherein the service security identifier is allocated to the instance of the out of process COM object for administrator level application program interface calls; and updating an access control list with the service security identifier.

9. The method of claim 8 wherein said step of notifying a user comprises launching an interactive dialog application.

10. The method of claim 8 wherein said step of launching a binary application for providing administrator level privilege to functions in the activation wizard comprises checking the privilege level assigned to the user with the assigned service security identifier.

11. The method of claim 8 wherein the binary application for providing administrator level privilege to functions in the activation wizard comprises an out of process COM object.

* * * * *